(12) United States Patent
Ley et al.

(10) Patent No.: US 10,018,244 B2
(45) Date of Patent: *Jul. 10, 2018

(54) DAMPED PROPSHAFT ASSEMBLY AND TUNED DAMPER FOR A DAMPED PROPSHAFT ASSEMBLY

(71) Applicant: American Axle & Manufacturing, Inc., Detroit, MI (US)

(72) Inventors: Jason Ley, Rochester Hills, MI (US); Zhaohui Sun, Rochester Hills, MI (US); William Braun, Troy, MI (US); Jeffrey P. Nyquist, Washington Township, MI (US); Michael A. Voight, Troy, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 324 days.

This patent is subject to a terminal disclaimer.

(21) Appl. No.: 14/924,940

(22) Filed: Oct. 28, 2015

(65) Prior Publication Data

US 2016/0047436 A1 Feb. 18, 2016

Related U.S. Application Data

(63) Continuation of application No. 14/470,091, filed on Aug. 27, 2014, now Pat. No. 9,175,718, which is a (Continued)

(51) Int. Cl.
*F16F 15/14* (2006.01)
*F16C 3/02* (2006.01)
(Continued)

(52) U.S. Cl.
CPC .......... *F16F 15/1435* (2013.01); *B60K 17/22* (2013.01); *F16C 3/02* (2013.01);
(Continued)

(58) Field of Classification Search
CPC .......... Y10T 29/4957; Y10T 29/49622; Y10T 29/49774; Y10T 29/49863;
(Continued)

(56) References Cited

U.S. PATENT DOCUMENTS 2,001,166 A 5/1935 Sw Enn Es
2,751,765 A 6/1956 Rowland et al.
(Continued)

*Primary Examiner* — Matthew P Travers
(74) *Attorney, Agent, or Firm* — Harness, Dickey & Pierce, P.L.C.

(57) ABSTRACT

A damped propshaft assembly with a hollow shaft and a tuned damper, which is received in the hollow shaft and includes a liner and a damping member. The liner's mass and stiffness are tuned to attenuate one or more of a bending mode vibration and a torsion mode vibration that occurs at a first predetermined frequency. The liner is not configured to substantially damp shell mode vibration that occurs at a frequency that is not equal to the first predetermined frequency. The damping member is coupled to the liner and is configured to primarily attenuate shell mode vibration in the hollow shaft at one or more desired frequencies. The tuned damper attenuates the at least one of the bending moment vibration and the torsion mode vibration at the first predetermined frequency and also attenuates shell mode vibration. A method for forming a damped propshaft assembly is also provided.

22 Claims, 4 Drawing Sheets

Related U.S. Application Data continuation of application No. 14/254,134, filed on Apr. 16, 2014, now Pat. No. 8,863,390.

(51) Int. Cl.
*F16F 15/32* (2006.01)
*B60K 17/22* (2006.01)

(52) U.S. Cl.
CPC ............ *F16C 3/023* (2013.01); *F16F 15/322* (2013.01); *B60Y 2300/207* (2013.01); *F16C 2204/20* (2013.01); *F16C 2326/06* (2013.01); *Y10T 29/4957* (2015.01); *Y10T 29/49622* (2015.01); *Y10T 29/49904* (2015.01); *Y10T 464/50* (2015.01)

(58) Field of Classification Search
CPC ......... Y10T 29/49872; Y10T 29/49904; F16C 3/02; F16C 3/023; F16C 2326/06; F16F 15/10; F16F 15/20; F16F 15/22; F16F 15/1435; F16F 15/322
See application file for complete search history.

(56) References Cited

U.S. PATENT DOCUMENTS

| | | |
|---|---|---|
| 3,052,107 A | 6/1956 | Kempf |
| 3,592,884 A | 7/1971 | Williams |
| 4,014,184 A | 3/1977 | Stark |
| 4,043,147 A | 8/1977 | Wiebe |
| 4,124,928 A | 11/1978 | Stark |
| 4,844,193 A | 7/1989 | Veselica et al. |
| 4,909,361 A | 3/1990 | Stark et al. |
| 5,056,763 A | 10/1991 | Hamada et al. |
| 5,243,880 A | 9/1993 | Beier et al. |
| 5,287,768 A | 2/1994 | Amborn et al. |
| 5,326,324 A | 7/1994 | Hamada |
| 5,566,721 A | 10/1996 | Breese |
| 5,868,627 A | 2/1999 | Stark et al. |
| 5,904,622 A | 5/1999 | Breese et al. |
| 5,924,531 A | 7/1999 | Stark et al. |
| 5,976,021 A | 11/1999 | Stark et al. |
| 5,983,497 A | 11/1999 | Breese et al. |
| 6,023,830 A | 2/2000 | Cole et al. |
| 6,234,911 B1 | 5/2001 | Breese et al. |
| 6,312,340 B1 | 11/2001 | Gassen et al. |
| 6,319,134 B1 | 11/2001 | Menosky et al. |
| 6,370,756 B1 | 4/2002 | Conger et al. |
| 6,409,606 B1 | 6/2002 | Nakajima et al. |
| 6,428,017 B1 | 8/2002 | Galonska et al. |
| 6,527,644 B2 | 3/2003 | Glowacki et al. |
| 6,623,365 B1 | 9/2003 | Maretzke et al. |
| 6,725,985 B2 | 4/2004 | Haneishi et al. |
| 6,752,722 B2 | 6/2004 | Armitage et al. |
| 6,793,050 B2 | 9/2004 | Nylander et al. |
| 6,837,345 B1 | 1/2005 | Lauble et al. |
| 6,874,228 B2 | 4/2005 | Armitage et al. |
| 6,889,803 B2 | 5/2005 | Schankin et al. |
| 6,966,413 B2 | 11/2005 | Haneishi et al. |
| 6,989,713 B2 | 1/2006 | Matsuura et al. |
| 7,083,523 B2 | 8/2006 | Haile et al. |
| 7,134,964 B2 | 11/2006 | Dine et al. |
| 7,192,357 B2 | 3/2007 | Kawakami |
| 7,204,762 B2 | 4/2007 | Campbell |
| 7,214,135 B2 | 5/2007 | Laskey et al. |
| 7,320,381 B2 | 1/2008 | Patrascu et al. |
| 7,416,491 B2 | 8/2008 | Campbell et al. |
| 7,438,612 B2 | 10/2008 | Wada et al. |
| 7,533,756 B2 | 5/2009 | Patrascu et al. |
| 7,549,927 B2 | 6/2009 | Haile et al. |
| 7,713,132 B2 | 5/2010 | Habara |
| 7,749,086 B2 | 7/2010 | Toita |
| 7,774,911 B2 | 8/2010 | Sun et al. |
| 2006/0276250 A1 | 12/2006 | Tkacik et al. |
| 2006/0276251 A1 | 12/2006 | Tkacik et al. |
| 2006/0276252 A1 | 12/2006 | Tkacik et al. |
| 2009/0048031 A1 | 2/2009 | Conger et al. |

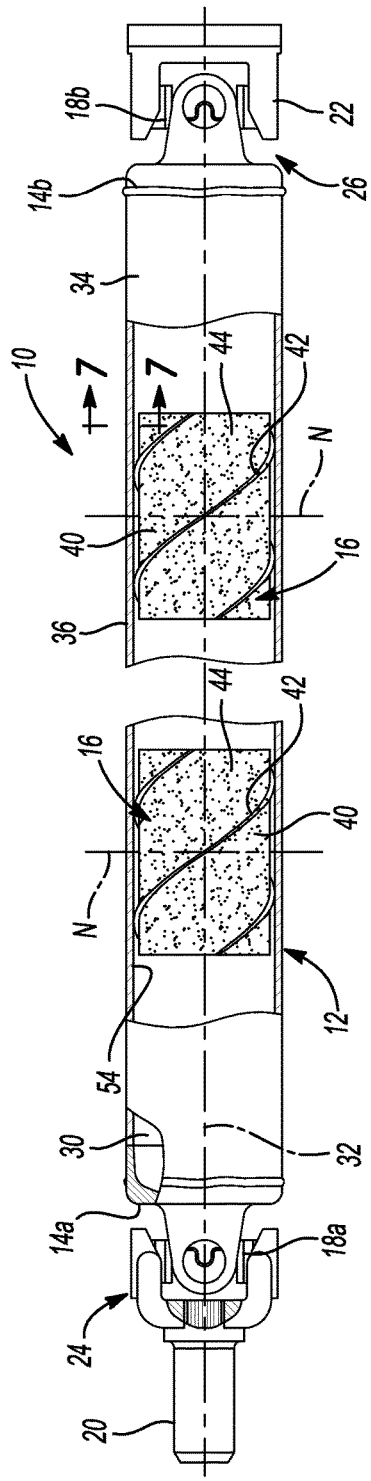
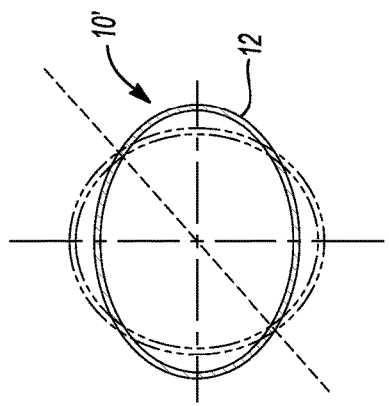
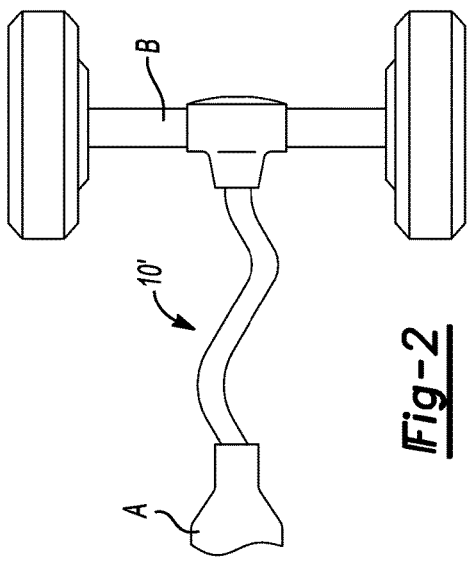

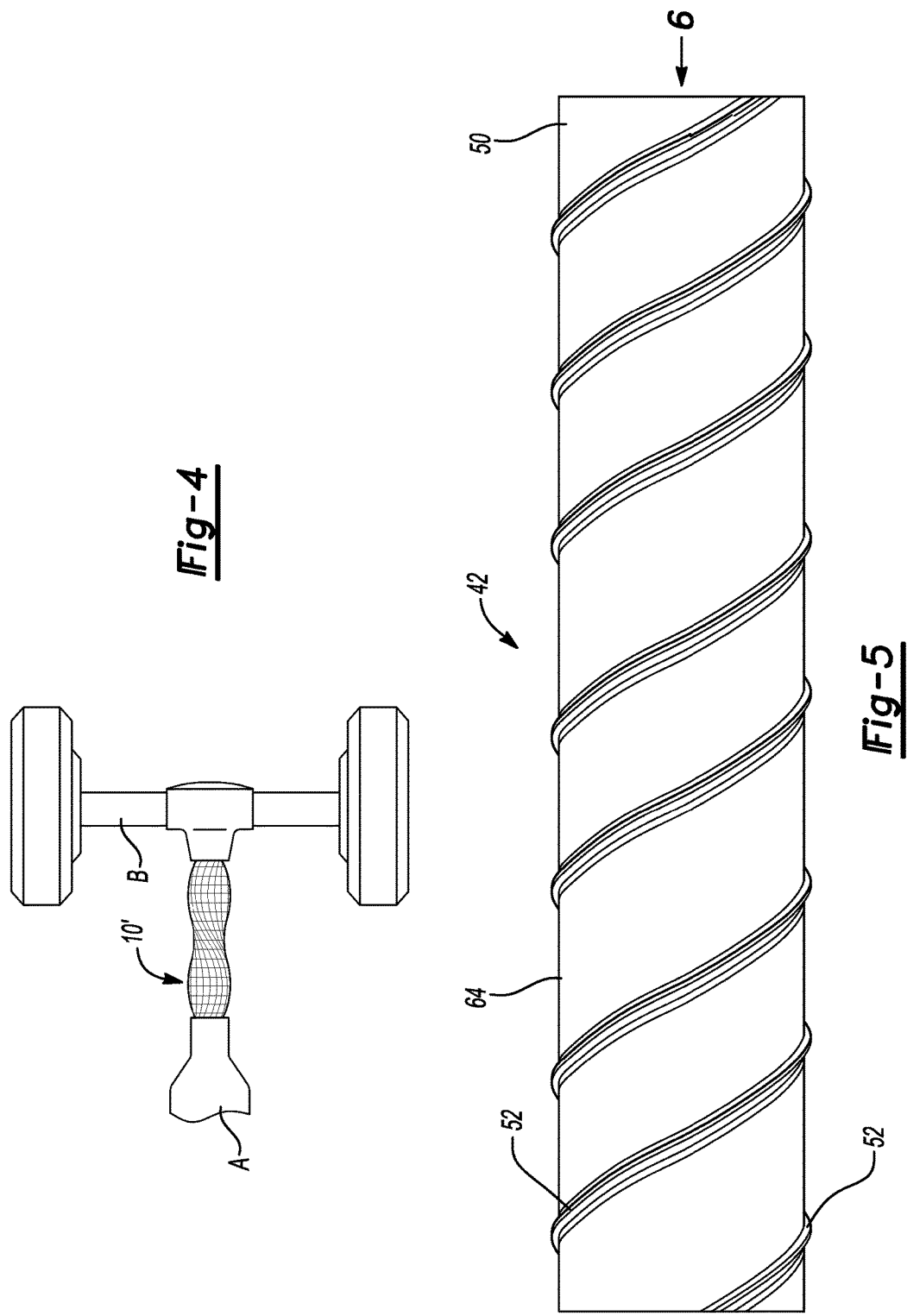

DAMPED PROPSHAFT ASSEMBLY AND TUNED DAMPER FOR A DAMPED PROPSHAFT ASSEMBLY

CROSS-REFERENCE TO RELATED APPLICATIONS

This application is continuation of U.S. patent application Ser. No. 14/470,091 filed Aug. 27, 2014 (now U.S. Pat. No. 9,175,718 issued Nov. 3, 2015), which is a continuation of U.S. patent application Ser. No. 14/254,134 filed Apr. 16, 2014 (now U.S. Pat. No. 8,863,390 issued Oct. 21, 2014). The entire disclosure of each of the above application is incorporated herein by reference.

FIELD

The present disclosure relates to a method for fabricating a damped propshaft assembly.

BACKGROUND

This section provides background information related to the present disclosure which is not necessarily prior art.

The consumers of modern automotive vehicles are increasingly influenced in their purchasing decisions and in their opinions of the quality of a vehicle by their satisfaction with the vehicle's sound quality. In this regard, consumers increasingly expect the interior of the vehicle to be quiet and free of noise from the power train and drive line. Consequently, vehicle manufacturers and their suppliers are under constant pressure to reduce noise to meet the increasingly stringent expectations of consumers.

Drive line components and their integration into a vehicle typically play a significant role in sound quality of a vehicle as they can provide the forcing function that excites specific driveline, suspension and body resonances to produce noise. Since this noise can be tonal in nature, it is usually readily detected by the occupants of a vehicle regardless of other noise levels. Common driveline excitation sources can include driveline imbalance and/or run-out, fluctuations in engine torque, engine idle shake, and motion variation in the meshing gear teeth of the hypoid gear set (i.e., the pinion gear and the ring gear of a differential assembly).

Motion variation is the slight variation in angular displacement between the input and output gears of a gear set. This variation is typically very small and can be on the order of tens of millionths of an inch (measured tangentially at the pitch line of the gear) for a modern automotive differential assembly. Motion variation is typically not constant (e.g., it will typically vary as a function of load, temperature, gearset build position, and break-in wear) and moreover, it cannot be reduced beyond certain levels without severe economic penalties.

Propeller (prop) shafts are typically employed to transmit rotary power in a drive line. Modern automotive propshafts are commonly formed of relatively thin-walled steel or aluminum tubing and as such, can be receptive to various driveline excitation sources. The various excitation sources can typically cause the propshaft to vibrate in a bending (lateral) mode, a torsion mode and a shell mode. Bending mode vibration is a phenomenon wherein energy is transmitted longitudinally along the shaft and causes the shaft to bend at one or more locations. Torsion mode vibration is a phenomenon wherein energy is transmitted tangentially through the shaft and causes the shaft to twist. Shell mode vibration is a phenomenon wherein a standing wave is transmitted circumferentially about the shaft and causes the cross-section of the shaft to deflect or bend along one or more axes.

Several techniques have been employed to attenuate vibrations in propshafts including the use of weights and liners. U.S. Pat. No. 2,001,166 to Swennes, for example, discloses the use of a pair of discrete plugs or weights to attenuate vibrations. The weights of the '166 patent are frictionally engaged to the propshaft at experimentally-derived locations and as such, it appears that the weights are employed as a resistive means to attenuate bending mode vibration. As used herein, resistive attenuation of vibration refers to a vibration attenuation means that deforms as vibration energy is transmitted through it (i.e., the vibration attenuation means) so that the vibration attenuation means absorbs (and thereby attenuates) the vibration energy. While this technique can be effective, the additional mass of the weights can require changes in the propshaft mounting hardware and/or propshaft geometry (e.g., wall thickness) and/or can change the critical speed of the propshaft. Moreover, as the plugs tend to be relatively short, they typically would not effectively attenuate shell mode vibration or torsion mode vibration.

U.S. Pat. No. 3,075,406 to Butler Jr., et al. appears to disclose a single damper that is inserted to a hollow shaft. The damper includes a pair of resilient members, which frictionally engage the interior surface of the hollow shaft, and a metal bar that is suspended within the interior of the hollow shaft by the resilient members. The '406 patent explains that at the resonant vibration frequency of the propeller shaft, "the motion of the mass is out of phase with the radial motion of the tubular propeller shaft". Accordingly, the damper of the '406 patent appears to be a reactive damper for attenuating bending mode vibration. As used herein, reactive attenuation of vibration refers to a mechanism that can oscillate in opposition to the vibration energy to thereby "cancel out" a portion of the vibration energy. The damper of the '406 patent appears to be ineffective at attenuating torsion mode vibration and shell mode vibration due to its relatively short length and its contact with a relatively small portion of the interior surface of the propshaft.

U.S. Pat. No. 2,751,765 to Rowland et al., U.S. Pat. No. 4,014,184 to Stark and U.S. Pat. Nos. 4,909,361 and 5,976,021 to Stark et al. disclose hollow liners for a propshaft. The '765 and '184 patents appear to disclose hollow multi-ply cardboard liners that are press-fit to the propshaft; the cardboard liners are relatively long and appear to extend substantially coextensively with the hollow shaft. The '361 and '021 patents appear to disclose liners having a hollow cardboard core and a helical retaining strip that extends a relatively short distance (e.g., 0.03 inch) from the outside diameter of the core. The retaining strip has high frictional properties to frictionally engage the propshaft. Accordingly, the liners of the '765, '184, '361 and '021 patents appear to disclose a resistive means for attenuating shell mode vibration. These liners, however, do not appear to be suitable for attenuating bending mode vibration or torsion mode vibration.

In view of the foregoing, there remains a need in the art for an improved method for damping various types of vibrations in a hollow shaft. This method facilitates the damping of shell mode vibration as well as the damping of bending mode vibration and/or torsion mode vibration.

SUMMARY

This section provides a general summary of the disclosure, and is not a comprehensive disclosure of its full scope or all of its features.

In one form, the present teachings provide a method for manufacturing a shaft assembly for a driveline system that includes a first driveline component and a second driveline component. The shaft assembly is configured to transmit torque between the first driveline component and the second driveline component. The method includes: providing a hollow shaft; tuning a mass and a stiffness of at least one liner to form an intermediate damper, the intermediate damper being configured to attenuate at least one of a bending moment vibration and a torsion mode vibration that occurs at a first predetermined frequency; tuning the intermediate damper to form a tuned damper, the tuned damper attenuating the at least one of the bending moment vibration and the torsion mode vibration at the first predetermined frequency and also attenuating shell mode vibration; and installing the tuned damper into the hollow shaft.

In another form, the present teachings provide a method for manufacturing a shaft assembly for a driveline system that includes a first driveline component and a second driveline component. The shaft assembly is configured to transmit torque between the first driveline component and the second driveline component. The method includes: providing a hollow shaft; tuning at least one liner to form a tuned reactive absorber for attenuating bending mode vibrations; installing a damping member to the tuned reactive absorber to provide multi-mode, multi-frequency resistive vibration damping of shell mode vibration and at least one of torsion mode vibration and bending mode vibration; and inserting the at least one liner with the damping member into the shaft member.

In still another form, the present teachings provide a method for manufacturing a shaft assembly for a driveline system that includes a first driveline component and a second driveline component. The shaft assembly is configured to transmit torque between the first driveline component and the second driveline component. The method includes: providing a hollow shaft; tuning at least one liner to form a tuned reactive absorber for attenuating at least one of bending mode vibrations and torsion mode vibrations; further tuning the at least one liner such that it is also a multi-mode, multi-frequency resistive absorber that is configured to attenuate shell mode vibrations and the at least one of bending mode vibrations and torsion mode vibrations; and inserting the further tuned at least one liner into the shaft member.

In a further form, the preset teachings provide a damped propshaft assembly having a hollow shaft and a tuned damper. The tuned damper is received in the hollow shaft and has a liner and a damping member. The liner has a mass and a stiffness that are tuned to attenuate one or more of a bending mode vibration and a torsion mode vibration that occurs at a first predetermined frequency. The liner is not configured to substantially damp shell mode vibration that occurs at a frequency that is not equal to the first predetermined frequency. The damping member is coupled to the liner and is configured to primarily attenuate shell mode vibration in the hollow shaft at one or more desired frequencies. The tuned damper attenuates the at least one of the bending moment vibration and the torsion mode vibration at the first predetermined frequency and also attenuates shell mode vibration.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 side, partly sectioned, view of a propshaft assembly constructed in accordance with the teachings of the present disclosure;

FIG. 2 is a schematic illustration of a portion of a driveline illustrating an untreated propshaft vibrating in a second bending mode;

FIG. 3 is a sectional view of a portion of the untreated propshaft taken perpendicular to the longitudinal (rotational) axis of the propshaft illustrating the propshaft vibrating in a first shell mode;

FIG. 4 is a schematic illustration of a portion of a driveline illustrating an untreated propshaft vibrating in a torsion mode;

FIG. 5 is a side view of a portion of the propshaft assembly of FIG. 1 illustrating an intermediate damper in more detail;

Corresponding reference numerals indicate corresponding parts throughout the several views of the drawings.

DETAILED DESCRIPTION

Figure 6:
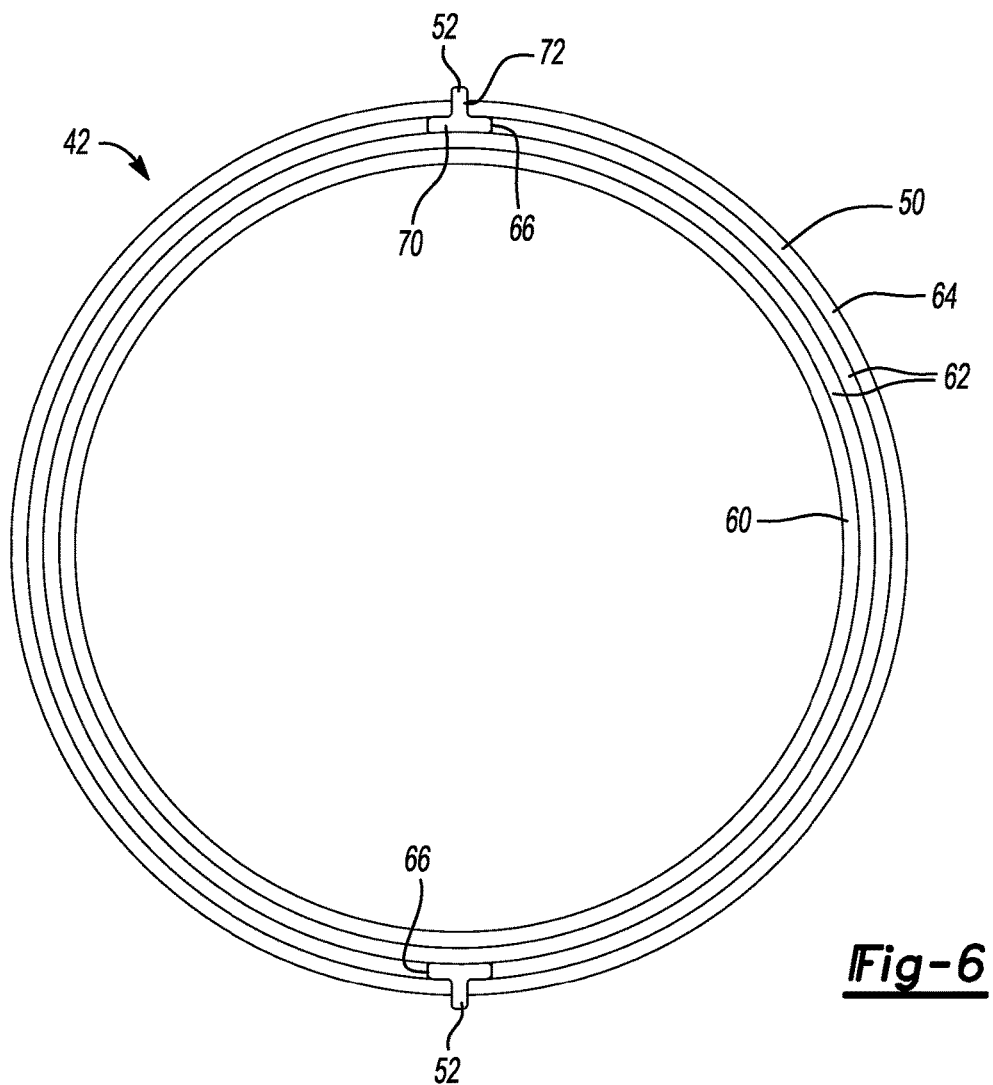
FIG. 6 is a right side view of the intermediate damper taken in the direction of arrow 6 in FIG. 5.

Example embodiments will now be described more fully with reference to the accompanying drawings.

With reference to FIG. 1 of the drawings, propshaft assembly constructed in accordance with the teachings of the present disclosure is generally indicated by reference numeral 10. The propshaft assembly 10 can be employed to transfer rotary power between two driveline components, such as between a transfer case or a transmission and an axle assembly as is disclosed in commonly assigned U.S. Pat. No. 7,774,911, the disclosure of which is incorporated by reference as if fully set forth in detail herein. The propshaft assembly 10 can include a shaft structure 12, first and second trunnion caps 14a and 14b, at least one damper 16, first and second spiders 18a and 18b, a yoke assembly 20 and a yoke flange 22. The first and second trunnion caps 14a and 14b, the first and second spider 18a and 18b, the yoke assembly 20 and the yoke flange 22 can be conventional in their construction and operation and as such, need not be discussed in detail. Briefly, the first and second trunnion caps 14a and 14b can be fixedly coupled to the opposite ends of the shaft structure 12, typically via a weld. Each of the first and second spiders 18a and 18b can be coupled to an associated one of the first and second trunnion caps 14a and 14b and to an associated one of the yoke assembly 20 and the yoke flange 22. The yoke assembly, first spider 18a, and first trunnion cap 14a can collectively form a first universal joint 24, while the yoke flange 22, second spider 18b and second trunnion cap 14b can collectively form a second universal joint 26.

A splined portion of the yoke assembly 20 can be rotatably coupled with the output of a first driveline component, such as an output shaft of a transmission, a power take-off unit, or a transfer case, and the yoke flange 22 can be rotatably coupled with an input shaft of a second driveline component, such as an axle assembly. The first and second universal joints 24 and 26 can facilitate a predetermined degree of vertical and horizontal offset between the first and second driveline components.

The shaft structure 12 can be generally cylindrical, having a hollow central cavity 30 and a longitudinal axis 32. The shaft structure 12 can be formed of any suitable material. In the particular example provided, the shaft structure 12 is formed of welded seamless 6061-T6 aluminum tubing conforming to ASTM B-210. Also in the particular embodiment illustrated, the shaft structure 12 is uniform in diameter and cross-section between the ends 34, but it will be appreciated that the shaft structure could be otherwise formed. For example, the ends 34 of the shaft structure 12 could be necked-down (e.g., via rotary swaging) relative to a central portion 36 of the shaft structure 12.

With reference to FIGS. 2 through 4, it will be appreciated that an undamped propshaft assembly 10' (e.g., the propshaft assembly 10 without the at least one damper 16 of FIG. 1) could be susceptible to several types of vibration. In FIG. 2, for example, the untreated propshaft assembly 10' is illustrated as vibrating at a bending mode natural frequency (i.e., a second bending mode (n=2) natural frequency) of the propshaft assembly 10' as installed in an automotive driveline between the first and second driveline components A and B, respectively. In this regard, those of ordinary skill in the art will appreciate that the bending mode natural frequency is a function of not only the propshaft assembly 10', but also of the "boundary conditions" (i.e., the manner in which the propshaft assembly 10' is coupled to the remainder of the automotive driveline). Consequently, the term "propshaft assembly as installed in the driveline" will be understood to include not only the shaft assembly but also the boundary conditions under which the shaft assembly is installed to the first and second driveline components.

In FIG. 3, the propshaft assembly 10' is illustrated as vibrating at a shell mode natural frequency (i.e., a first (n=1) shell mode natural frequency) of the shaft structure 12.

In FIG. 4, the propshaft assembly 10' is illustrated as vibrating at a natural torsion frequency of the driveline 16' in a torsion mode (i.e., a first (n=1) torsion mode). In this regard, those of ordinary skill in the art will appreciate that the natural torsion frequency is a function of not only the propshaft assembly 10', but also of the first and second drive line components A and B to which the propshaft assembly is coupled.

Returning to FIG. 1, the propshaft assembly 10 of the particular example provided includes a damper 16 that comprises two tuned dampers 40 that are identically configured. It will be appreciated in view of this disclosure, however, that other quantities of tuned dampers 40 may be utilized and that the tuned dampers 40 need not be identically configured (i.e., each tuned damper 40 can have different damping characteristics and a first one of the tuned dampers 40 can be different from a second one of the tuned dampers 40). In the particular example provided, each of the tuned dampers 40 comprises an intermediate damper 42 and a damping member 44.

With additional reference to FIGS. 5 and 6, the intermediate damper 42 can be a liner that can have a structure that can be constructed in a manner that is similar to that which is described in U.S. Pat. No. 4,909,361, the disclosure of which is hereby incorporated by reference as if fully set forth in its entirety herein. Briefly, the intermediate damper 42 can include a structural portion 50 and one or more resilient members 52 that are coupled to the structural portion 50. The intermediate dampers 42 are sized such that the structural portion 50 is smaller than the inner diameter of the shaft member 12 (FIG. 1) but the resilient member(s) 52 is/are sized to frictionally engage the inner diametrical surface 54 (FIG. 1) of the shaft member 12 (FIG. 1).

In the example provided, the structural portion 50 includes a hollow core 60, one or more intermediate members 62 and a cover member 64. The core 60 can be formed of a fibrous material, such as cardboard. In the particular example provided, the core 60 is formed of a suitable number of plies of helically wound paperboard. The intermediate members 62 can also be formed of a paperboard and can be helically wound onto and adhered (via a suitable adhesive) to the core 60 in a manner that forms one or more helical gaps 66. In the particular example provided, two helical gaps 66 are formed. It will be appreciated that the structural portion 50 could be formed of any appropriate material, including cardboard, plastic resins, carbon fiber, fiberglass, metal and combinations thereof. It will also be appreciated that the structural portion 50 need not include an intermediate member 62 or a cover member 64 and need not define one or more gaps 66. It will further be appreciated that the gaps 66, if used, need not be helical in shape but rather could be formed in other manners, such as circumferentially or longitudinally.

The resilient members 52 can be formed of an appropriate elastomer and can include a base 70 and one or more lip members 72 that can be coupled to the base 70. The base 70 can be fixedly coupled to the structural portion 50 via a suitable adhesive such that the lip members 72 extend radially outwardly therefrom. The cover member 64 can be wrapped over the intermediate member(s) 62 and the base 70 and can be employed to further secure the resilient members 52 to the structural portion 50.

It will be appreciated from this disclosure that where two or more resilient members 52 are employed, the resilient members 52 can be formed of the same material and are coupled to the structural portion 50 such that their bases 70 are received in an associated gap 66. It will also be appreciated from this disclosure that in the alternative, the resilient members 52 may be formed differently (e.g., with different materials, different sizes and/or different cross-sections).

With reference to FIGS. 1, 5 and 6, it will be further appreciated from this disclosure that the mass and the stiffness of the intermediate damper(s) 42 is/are tuned to the driveline such that the intermediate damper(s) 42 acts or act as one or more of: (i) a tuned reactive absorber for attenuating bending mode vibrations, and (ii) a tuned reactive absorber for attenuating torsion mode vibrations. The intermediate damper(s) 42 is/are not configured to substantially damp shell mode vibration occurring at a frequency that is less than or equal to a predetermined threshold, such as 1000 Hz. The intermediate damper(s) 42 may be tuned such that a ratio of the mass of the intermediate damper(s) 42 to a mass of the shaft member 12 is about 5% to about 30%. In the particular example provided, the ratio of the mass of the intermediate dampers 42 to the mass of the shaft member 12 is about 16.9%.

Where the intermediate damper(s) 42 is/are employed to attenuate bending mode vibrations, they are preferably tuned to a natural frequency corresponding to at least one of a first bending mode, a second bending mode and a third bending mode of the propshaft assembly 10 as installed to the driveline. Where the intermediate damper(s) 42 is/are employed to attenuate torsion mode vibrations, they are preferably tuned to a natural frequency of the driveline in a torsion mode, such as to a frequency that is less than or equal to about 600 Hz.

It will also be appreciated from this disclosure that various characteristics of the intermediate damper 42 can be controlled to tune its damping properties in one or both of the bending mode and the torsion mode. In the particular example provided, the following variables were controlled: mass, length and outer diameter of the intermediate damper 42, diameter and wall thickness of the structural portion 50, material of which the structural portion 50 was fabricated, the quantity of the resilient members 52, the material of which the resilient members 52 was fabricated, the helix angle 80 and pitch 82 with which the resilient members 52 are fixed to the structural portion 50, the configuration of the lip member(s) 72 of the resilient member 52, and the location of the dampers 16 within the shaft member 12. In the particular example provided:

the shaft member 12 can have an outside diameter of between about 3.0 inches to about 5.8 inches, a wall thickness of about 0.08 inch, a length of about 64 inches, and can have a mass of about 3.2 kg;

the intermediate dampers 42 can have an outer diameter (over the resilient member(s) 52) of about 4.0 inches, a length of about 14 inches, a mass of about 270 grams, the structural portion 50 of the intermediate dampers 42 can be formed of paperboard and can have a wall thickness of about 0.07 inch and an inner diameter of about 3.56 inch, a pair of resilient members 52 can be coupled to the structural portion 50 offset 180 degrees from one another and each can have a helix angle 80 of about 22.5° and a pitch 82 of about 4.5 inches, each resilient member 52 can have a single lip member 72 and can be formed of a silicon material that conforms to ASTM D2000 M2GE505 having a durometer of about 45 Shore A to about 55 Shore A; and each of the intermediate dampers 42 can be configured to be inserted into an associated end of the shaft member 12 such that they are disposed generally symmetrically about an associated one of the second (n=2) bending anti-nodes N (FIG. 1).

It will be appreciated that in certain situations it may not be possible to exactly tune the intermediate damper 42 to the relevant frequency or frequencies associated with a given propshaft assembly 10, as when a particular damper 16 is used across a family of propshaft assemblies. As such, it will be understood that an intermediate damper 42 will be considered to be tuned to a relevant frequency if it is effective in attenuating vibration at the relevant frequency. For example, the intermediate damper 42 can be considered to be tuned to a relevant frequency if a frequency at which it achieves maximum attenuation is within ±20% of that relevant frequency. Preferably, the intermediate damper 42 is considered to be tuned to the relevant frequency if the frequency at which it achieves maximum attenuation is within ±15% of the relevant frequency. More preferably, the intermediate damper 42 is considered to be tuned to the relevant frequency if the frequency at which it achieves maximum attenuation is within ±10% of the relevant frequency. Still more preferably, the intermediate damper 42 is considered to be tuned to the relevant frequency if the frequency at which it achieves maximum attenuation is within ±5% of the relevant frequency.

Figure 7:
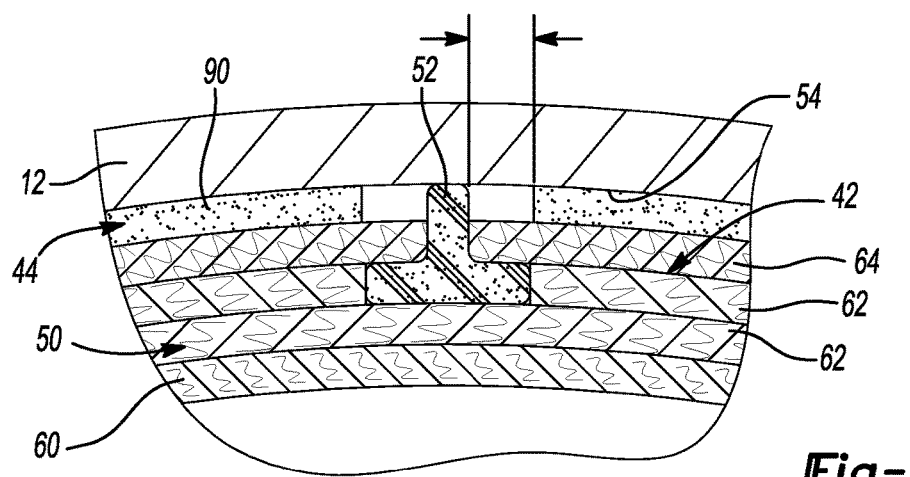
FIG. 7 is a cross-sectional view taken along the line 7-7 of FIG. 1.

With reference to FIGS. 1 and 7, the damping member 44 can be coupled to the intermediate damper 42 and can be configured to primarily attenuate shell mode vibration at one or more desired frequencies, but also to provide damping of at least one of bending mode vibration and torsion mode vibration. In the example provided, the damping member 44 provides broadband damping (i.e., damping at a plurality of frequencies) of shell mode vibration and broadband damping of at least one of bending mode vibration and torsion mode vibration. If desired, the damping member 44 can be tuned to a natural frequency corresponding to at least one of a first shell mode, a second shell mode and a third shell mode. It will be understood that a damping member 44 (as coupled to the intermediate damper 42) will be considered to be tuned to a relevant frequency if it is effective in attenuating shell mode vibration at the relevant frequency. For example, the damping member 44 (as coupled to the intermediate damper 42) can be considered to be tuned to a relevant frequency if a frequency at which it achieves maximum attenuation is within ±20% of that relevant frequency. Preferably, the damping member 44 (as coupled to the intermediate damper 42) is considered to be tuned to the relevant frequency if the frequency at which it achieves maximum attenuation is within ±15% of the relevant frequency. More preferably, the damping member 44 (as coupled to the intermediate damper 42) is considered to be tuned to the relevant frequency if the frequency at which it achieves maximum attenuation is within ±10% of the relevant frequency. Still more preferably, the damping member 44 (as coupled to the intermediate damper 42) is considered to be tuned to the relevant frequency if the frequency at which it achieves maximum attenuation is within ±5% of the relevant frequency. As another example, the damping member 44 (as coupled to the intermediate damper 42) can be considered to be tuned to a relevant shell mode frequency if damps shell mode vibrations by an amount that is greater than or equal to about 2%.

The damping member 44 can be a resistive absorber and can be configured to contact an inside surface 54 of the shaft member 12 over a relatively large surface area as compared with the area over which the intermediate damper 42 contacts the inside surface of the shaft member 12. For example, a ratio of the area over which the intermediate damper 42 contacts the inside surface of the shaft member 12 to the area over which the damping member 44 contacts the inside surface of the shaft member 12 can be less than or equal to five percent (5%), preferably less than or equal to two and one-half percent (2.5%) and more preferably less than or equal to one and one-quarter percent (1.25%). The damping member 44 can comprise a contact member 90 that is configured to contact the inside surface of the shaft member 12 and can be formed of a material having a durometer of about 40 Shore A to about 80 Shore A. The contact member 90 may be coupled to the intermediate damper 42 in any desired manner. For example, the contact member 90 can be configured as a strip of material that can be wound onto (and bonded to) the structural portion 50 in the space between the helix of the resilient members 52.

Figure 8:
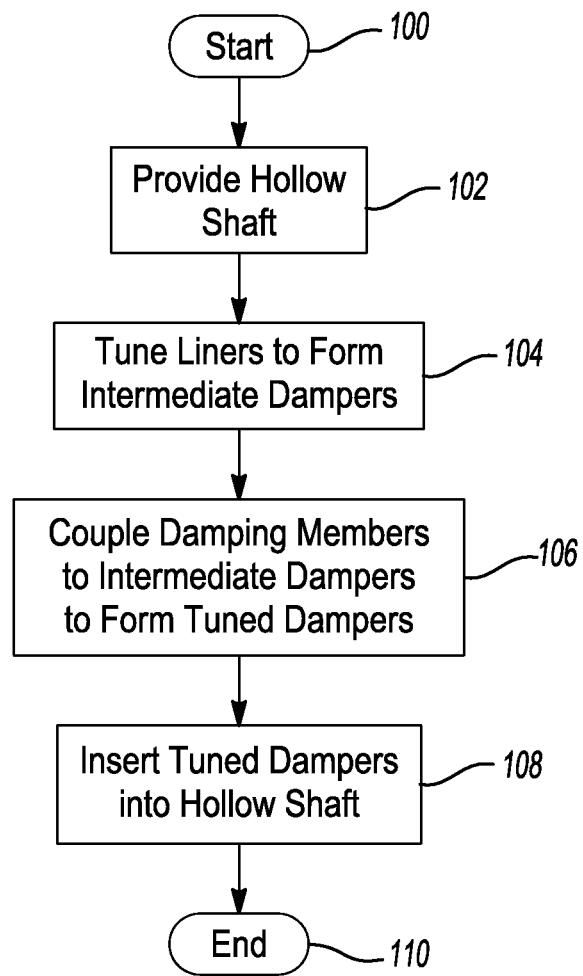
FIG. 8 is a schematic illustration in flowchart form of a method for forming a propshaft assembly in accordance with the teachings of the present disclosure.

With reference to FIG. 8, a method for forming a shaft assembly for a driveline system is schematically illustrated in flowchart form. It will be appreciated that the driveline system includes first and second driveline components and that the shaft assembly is configured to transmit torque between the first and second driveline components. The method can start at bubble 100 and proceed to block 102 where a hollow shaft is provided. The methodology can proceed to block 104.

At block 104 a set of intermediate dampers 42 (FIG. 1) can be formed by tuning the mass and stiffness of a set of liners to attenuate at least one of bending moment vibration and torsion mode vibration that occurs at a first predetermined frequency. The method can progress to block 106.

In block 106 the set of intermediate dampers 42 (FIG. 1) can be tuned to form a set of tuned dampers that can attenuate the bending and/or torsion mode vibration at the first predetermined frequency as well as shell mode vibration. A damping member 44 (FIG. 1) can be coupled to each of the intermediate dampers 42 (FIG. 1) as part of the tuning process. The damping member 44 (FIG. 1) can achieve broadband damping, such as broadband damping of shell mode vibration and optionally bending mode vibration. The methodology can proceed to block 108.

In block 108 the set of tuned dampers can be inserted into the hollow shaft member. The method can continue to bubble 110 where the methodology ends.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A damped propshaft assembly comprising:
   a hollow shaft; and
   a pair of tuned dampers received in the hollow shaft, each of the tuned dampers having a liner and a damping member, each of the liners comprising a tubular structure, which does not contact the hollow shaft, and at least one resilient member that is affixed to the tubular structure and contacts an interior surface of the hollow shaft, each of the liners having a mass and a stiffness that are tuned to attenuate one or more of a bending mode vibration and a torsion mode vibration that occurs at a first predetermined frequency, each of the liners not being configured to substantially damp shell mode vibration that occurs at a frequency that is not equal to the first predetermined frequency, each of the damping members being coupled to an associated one of the liners, each of the damping members being configured to primarily attenuate the shell mode vibration in the hollow shaft at one or more desired frequencies;
   wherein the tuned dampers attenuate the at least one of the bending mode vibration and the torsion mode vibration at the first predetermined frequency and also attenuates the shell mode vibration.

2. The damped propshaft assembly of claim 1, wherein the liners are not configured to substantially damp the shell mode vibration occurring at a frequency that is less than or equal to 1000 Hz.

3. The damped propshaft assembly of claim 1, wherein the damping members provide broadband damping.

4. The damped propshaft assembly of claim 3, wherein the broadband damping includes damping of the shell mode vibration and damping of bending mode vibration at a plurality of frequencies.

5. The damped propshaft assembly of claim 3, wherein each of the damping members is a resistive absorber.

6. The damped propshaft assembly of claim 3, wherein each of the liners is configured to contact an inside surface of the hollow shaft over a first area, wherein each of the damping members is configured to contact the inside surface of the hollow shaft over a second area, and wherein a ratio of the first area to the second area is less than or equal to five (5) percent.

7. The damped propshaft assembly of claim 6, wherein the ratio of the first area to the second area is less than or equal to two and one-half (2.5) percent.

8. The damped propshaft assembly of claim 7, wherein the ratio of the first area to the second area is less than or equal to one and one-quarter (1.25) percent.

9. The damped propshaft assembly of claim 3, wherein each of the damping members includes at least one contact member that is configured to contact an inside surface of the hollow shaft and wherein each of the damping members has a durometer of between 40 Shore A and 80 Shore A.

10. The damped propshaft assembly of claim 1, wherein each of the liners is disposed symmetrically about a bending anti-node.

11. The damped propshaft assembly of claim 10, wherein the bending anti-node is a second bending anti-node.

12. The damped propshaft assembly of claim 1, wherein each of the tubular structures is formed of cardboard.

13. A tuned damper for damping a propshaft assembly, the propshaft assembly including a hollow shaft with an inside diametrical surface, the tuned damper comprising:
    a liner having a tubular structure and at least one resilient member, the tubular structure having a diameter that is smaller than the inside diametrical surface so that the tubular structure does not touch the inside diametrical surface when the tuned damper is received into the hollow shaft, the at least one resilient member being affixed to the tubular structure and configured to contact the inside diametrical surface of the hollow shaft, the liner having a mass and a stiffness that are tuned to attenuate one or more of a bending mode vibration and a torsion mode vibration that occurs at a first predetermined frequency, the liner itself not being configured to substantially damp shell mode vibration that occurs at a frequency that is not equal to the first predetermined frequency,
    a damping member coupled to the liner, the damping member being configured to primarily attenuate the shell mode vibration in the hollow shaft at one or more desired frequencies;
    wherein the tuned damper is configured to attenuate the at least one of the bending mode vibration and the torsion mode vibration at the first predetermined frequency and is also configured to attenuate the shell mode vibration.

14. The tuned damper of claim 13, wherein the liner is not configured to substantially damp the shell mode vibration occurring at a frequency that is less than or equal to 1000 Hz.

15. The tuned damper of claim 13, wherein the damping member provides broadband damping.

16. The tuned damper of claim 15, wherein the broadband damping includes damping of the shell mode vibration and damping of bending mode vibration at a plurality of frequencies.

17. The tuned damper of claim 15, wherein the damping member is a resistive absorber.

18. The tuned damper of claim 15, wherein the liner is configured to contact an inside surface of the hollow shaft over a first area, wherein the damping member is configured to contact the inside surface of the hollow shaft over a second area, and wherein a ratio of the first area to the second area is less than or equal to five (5) percent.

19. The tuned damper of claim 18, wherein the ratio of the first area to the second area is less than or equal to two and one-half (2.5) percent.

20. The tuned damper of claim 19, wherein the ratio of the first area to the second area is less than or equal to one and one-quarter (1.25) percent.

21. The tuned damper of claim 13, wherein the damping member includes at least one contact member that is configured to contact an inside surface of the hollow shaft and wherein the damping member has a durometer of between 40 Shore A and 80 Shore A.

22. The tuned damper of claim 13, wherein the tubular structure is formed of cardboard.

* * * * *